(12) United States Patent
Lee et al.

(10) Patent No.: US 10,844,211 B2
(45) Date of Patent: Nov. 24, 2020

(54) MEMBRANE MATERIALS FOR PHOTOREACTIVE ADDITIVE MANUFACTURING

(71) Applicant: Intrepid Automation, San Diego, CA (US)

(72) Inventors: Shirley Lee, Poway, CA (US); Ben Wynne, Escondido, CA (US); Jamie Lynn Etcheson, San Diego, CA (US); Christopher Sean Tanner, San Diego, CA (US); Robert Lee Mueller, San Diego, CA (US); Ivan Dejesus Chousal, Chula Vista, CA (US)

(73) Assignee: Intrepid Automation, San Diego, CA (US)

(*) Notice: Subject to any disclaimer, the term of this patent is extended or adjusted under 35 U.S.C. 154(b) by 8 days.

(21) Appl. No.: 16/371,771

(22) Filed: Apr. 1, 2019

(65) Prior Publication Data

US 2020/0102450 A1    Apr. 2, 2020

Related U.S. Application Data

(60) Provisional application No. 62/739,476, filed on Oct. 1, 2018.

(51) Int. Cl.
```
B29C 64/135    (2017.01)
B29C 64/255    (2017.01)
B33Y 30/00     (2015.01)
C08L 27/24     (2006.01)
```
(52) U.S. Cl.
CPC ............ C08L 27/24 (2013.01); B29C 64/135 (2017.08); B29C 64/255 (2017.08); B33Y 30/00 (2014.12); *C08L 2205/02* (2013.01)

(58) Field of Classification Search
CPC ..... B29C 64/135; B29C 64/255; B33Y 30/00; B33Y 10/00; C08L 2205/02
See application file for complete search history.

(56) References Cited

U.S. PATENT DOCUMENTS

| | | |
|---|---|---|
| 2006/0276605 A1 | 12/2006 | Lai et al. |
| 2015/0034007 A1 | 2/2015 | Fischer et al. |
| 2015/0360419 A1* | 12/2015 | Willis .................. B29C 64/264 425/174.4 |
| 2016/0046075 A1 | 2/2016 | DeSimone et al. |

(Continued)

FOREIGN PATENT DOCUMENTS

| | | |
|---|---|---|
| CN | 105365218 A | 3/2016 |
| CN | 205148922 U | 4/2016 |

(Continued)

OTHER PUBLICATIONS

International Search Report dated Jan. 17, 2020 for PCT Patent Application No. PCT/US2019/053643.

*Primary Examiner* — Nahida Sultana
(74) *Attorney, Agent, or Firm* — MLO, a professional corp.

(57) ABSTRACT

A photoreactive additive manufacturing system comprises a resin tub, a membrane, and a resin pool confined by the resin tub and the membrane. In some embodiments, the membrane comprises a polymeric blend comprising a first polymer and a second polymer, and the first polymer is a fluoropolymer. In some embodiments, the membrane comprises a polymer and an additive to control the free volume of the polymer.

25 Claims, 7 Drawing Sheets

(56) References Cited

U.S. PATENT DOCUMENTS

| | | |
|---|---|---|
| 2016/0067921 A1 | 3/2016 | Willis et al. |
| 2016/0176112 A1 | 6/2016 | Liu |
| 2016/0200052 A1 | 7/2016 | Moore et al. |
| 2016/0325493 A1 | 11/2016 | DeSimone et al. |
| 2017/0232675 A1* | 8/2017 | Jaunet .................. B29C 64/165 264/494 |
| 2017/0291360 A1 | 10/2017 | Franke et al. |
| 2018/0029296 A1 | 2/2018 | Esbroeck et al. |
| 2018/0071976 A1 | 3/2018 | Tumbleston et al. |
| 2018/0264719 A1* | 9/2018 | Rolland ................. B33Y 50/00 |
| 2018/0341184 A1* | 11/2018 | Hundley ............... B29C 64/135 |
| 2019/0160733 A1* | 5/2019 | Mirkin .................. B29C 64/245 |
| 2020/0123422 A1* | 4/2020 | Fukuda ...................... C09J 7/28 |

FOREIGN PATENT DOCUMENTS

| | | |
|---|---|---|
| CN | 106042388 A | 10/2016 |
| CN | 104890245 B | 7/2017 |
| CN | 206840705 U | 1/2018 |

\* cited by examiner

MEMBRANE MATERIALS FOR PHOTOREACTIVE ADDITIVE MANUFACTURING

RELATED APPLICATIONS

This application claims the benefit of U.S. Provisional Patent Application No. 62/739,476, filed on Oct. 1, 2018, and entitled "Membrane Materials for Photoreactive Additive Manufacturing"; which is hereby incorporated by reference for all purposes.

BACKGROUND

There are many types of additive manufacturing (i.e., 3D printing) systems and methods. One method utilizes photoreactive resin (i.e., photopolymer) that cross-links and hardens from a liquid resin to a solid polymeric material upon exposure to light. These photoreactive 3D printing systems typically include a resin pool, an illumination system, and a print platform, where the illumination system projects an image into the resin pool causing a layer of a polymeric object to be formed on the print platform. The print platform then moves the printed layer out of the focal plane of the illumination system, and then the next layer is exposed (i.e., printed). In bottom illumination systems (i.e., with illumination sources under the resin pool), the resin pool can be contained within a resin tub with a membrane at the bottom of the tub.

Conventional photoreactive 3D printing systems typically utilize membranes composed of TEFLON® AF2400. A prevalent theory states that TEFLON® AF2400 works well as a membrane because it is an amorphous fluoropolymer, which contains more free volume than crystalline fluoropolymers. The high free volume content of TEFLON® AF2400 contributes to its unusually high oxygen permeability. The high oxygen permeability is advantageous because oxygen passing through the membrane creates an "inhibition zone" in the resin pool adjacent to the membrane. Oxygen reduces the photopolymerization rates within the inhibition zone, which allows unreacted resin to continuously diffuse to the fresh surface of the part during printing. The high oxygen permeability of TEFLON® AF2400 therefore reduces the amount of adhesion between the printed layer and the membrane. Additionally, the inhibition zone advantageously reduces the hydrostatic forces on the part and/or on the membrane, when the part is moved away from the membrane during printing.

SUMMARY

In some embodiments, a photoreactive additive manufacturing system comprises a resin tub, a membrane, and a resin pool confined by the resin tub and the membrane. In some embodiments, the membrane comprises a polymeric blend comprising a first polymer and a second polymer, and the first polymer is a fluoropolymer. In some embodiments, the membrane comprises a polymer and an additive to control the free volume of the polymer.

DETAILED DESCRIPTION

This disclosure describes materials and methods for windows and polymer membranes used in photoreactive additive manufacturing systems. Particularly, membrane materials and methods are described for photoreactive additive manufacturing systems with a pool of resin confined within a resin tub, and the membrane (e.g., at the bottom of the tub/pool) allows light to pass through and react with the resin in the pool to form a 3D printed layer.

In different embodiments, the materials (e.g., polymers), nucleating agents, additives, and/or processing methods are chosen to produce membranes with desirable properties for use in photoreactive additive manufacturing systems. In some embodiments, the membrane materials and/or methods of fabricating the membranes enable membranes that have sufficient transparency to electromagnetic radiation (e.g., in a wavelength range from 200 to 500 nm, or from 200 nm to 800 nm, or from 500 nm to 1000 nm, or other wavelength ranges), sufficient mechanical properties (e.g., biaxial strength to support the weight of the resin pool and/or remain flat during printing), sufficient durability (e.g., over repetitive tension cycles), innate release properties (i.e., to prevent adhesion of a printed object to the membrane), and/or the capability to produce an inhibition zone (i.e., a region adjacent to the membrane with reduced photopolymerization rates). Some of the membranes of the present embodiments are also advantageous in photoreactive additive manufacturing systems because they are more easily manufacturable than conventional membrane materials, and in some cases are manufacturable at lower costs than conventional membrane materials.

FIGS. 1A-1E illustrate an example of a photoreactive 3D printing system (PRPS) 100, which can utilize the present membranes, in accordance with some embodiments. The PRPS 100 shown in FIGS. 1A-1E contains a chassis 105, an image projection system (i.e. an "illumination system") 110, a display subsystem (i.e., an "image display system") 115, a resin pool 120, a resin tub 130, a membrane 135, a print platform 140, an elevator system 145, elevator arms 150, a z-stage 155, and a build area 160. The operation of the example PRPS 100 shown in FIGS. 1A-1E will now be described.

Figure 1A:
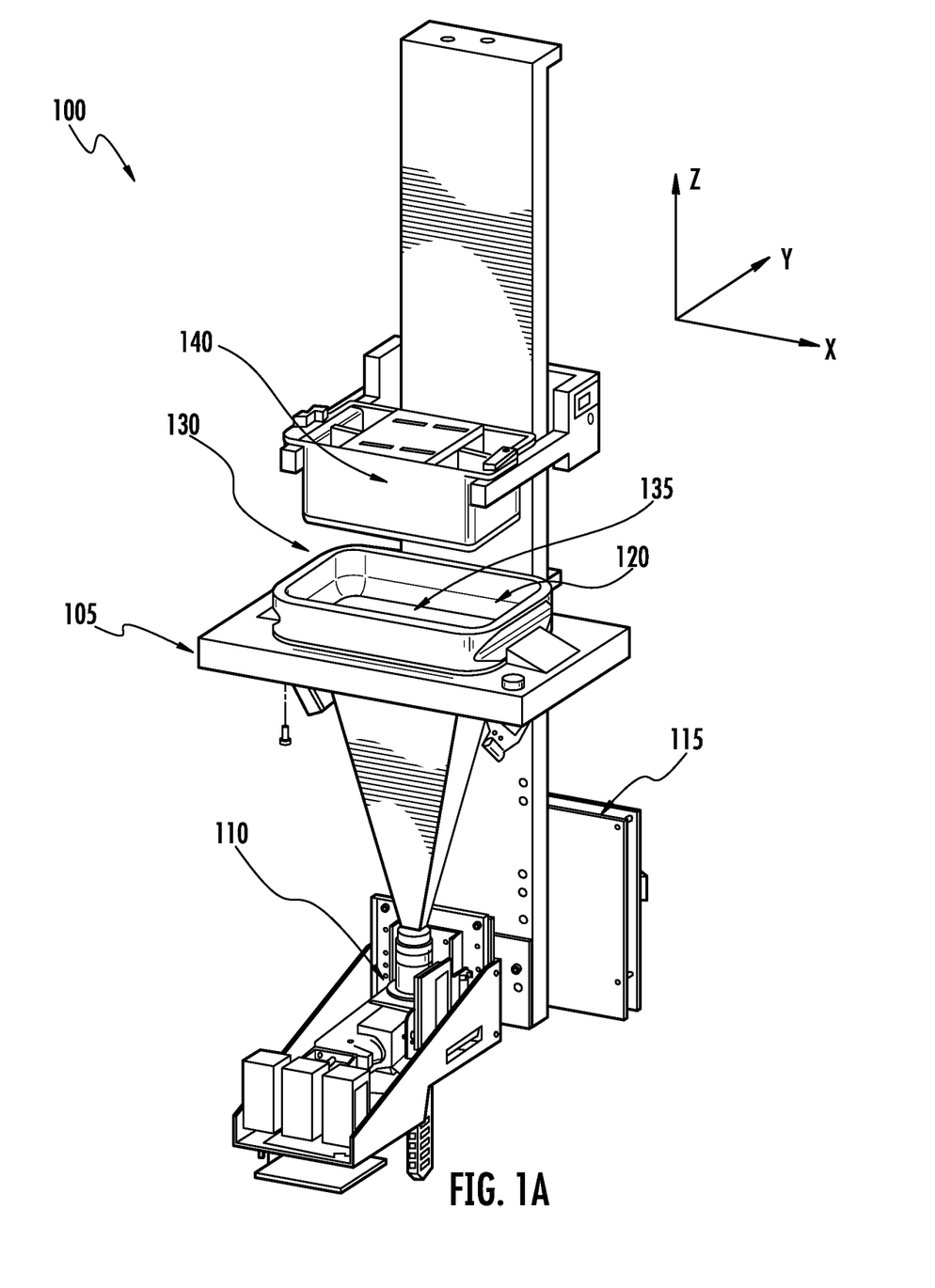
FIGS. 1A-1E are simplified perspective views of example photoreactive 3D printing systems (PRPSs), in accordance with some embodiments.
Figure 1B:
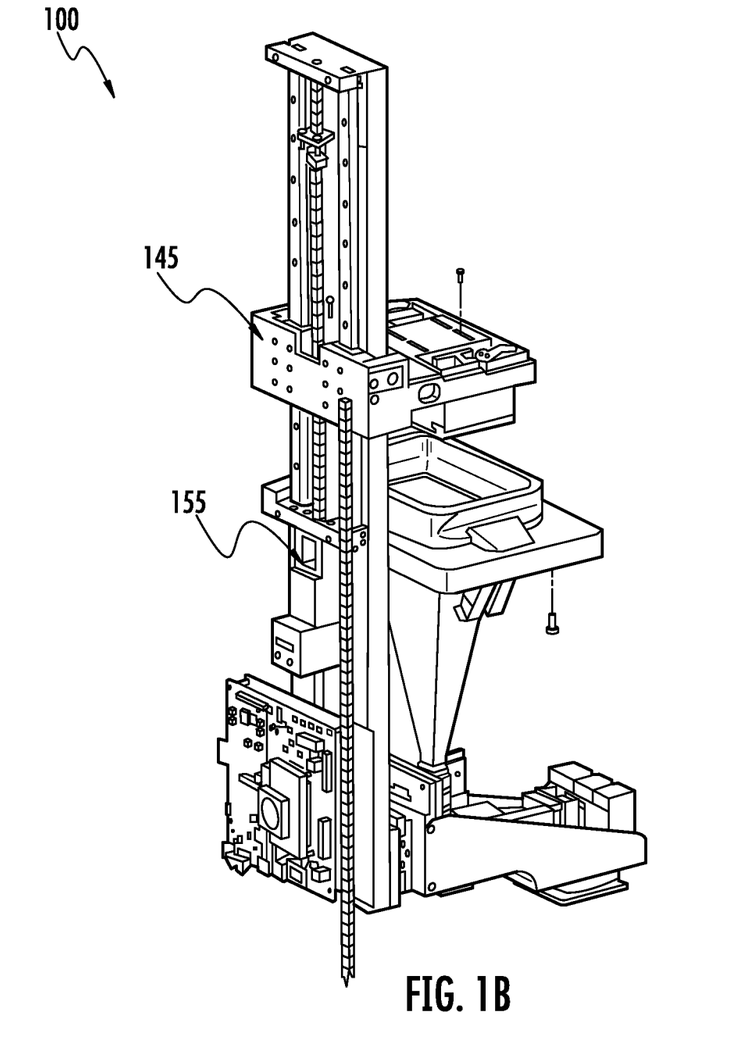
Figure 1C:
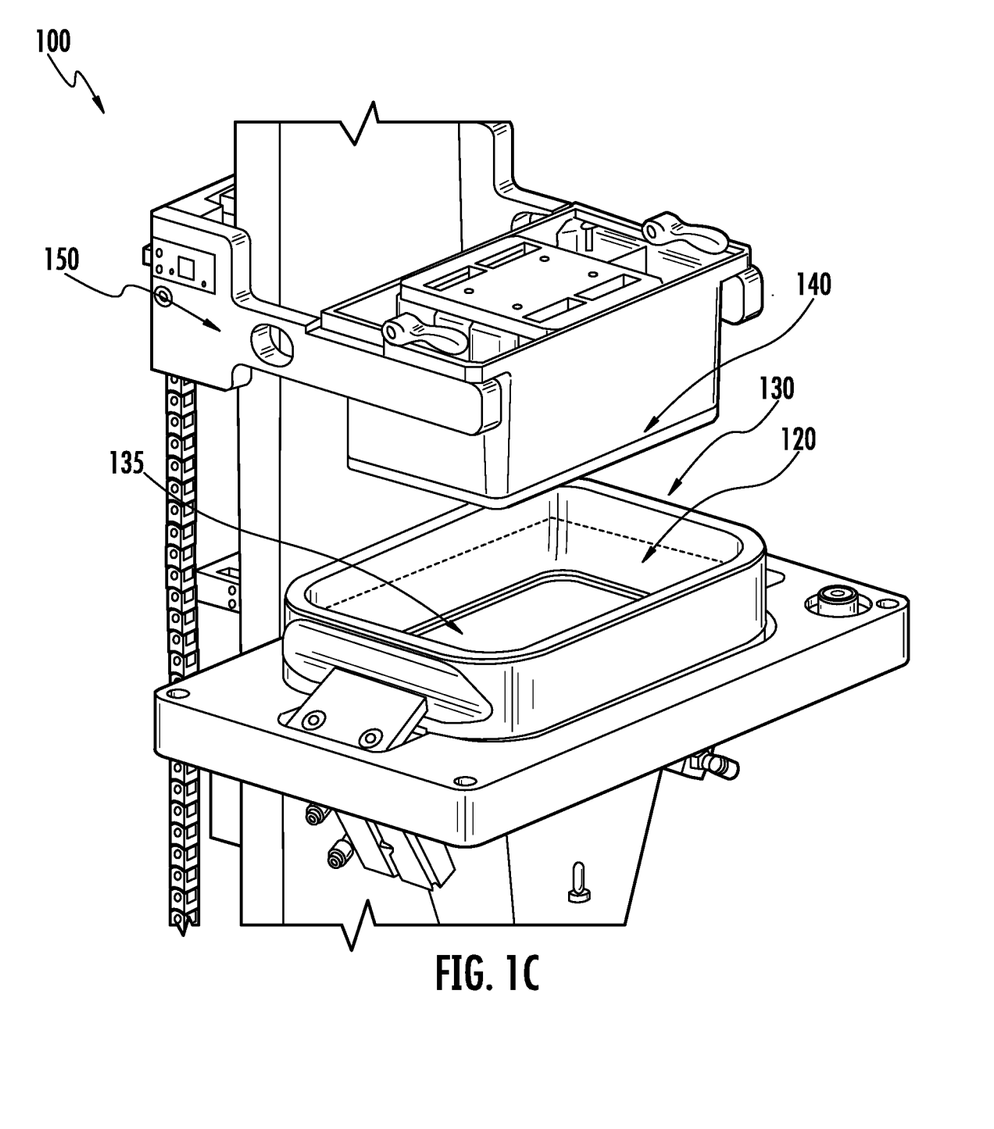
Figure 1D:
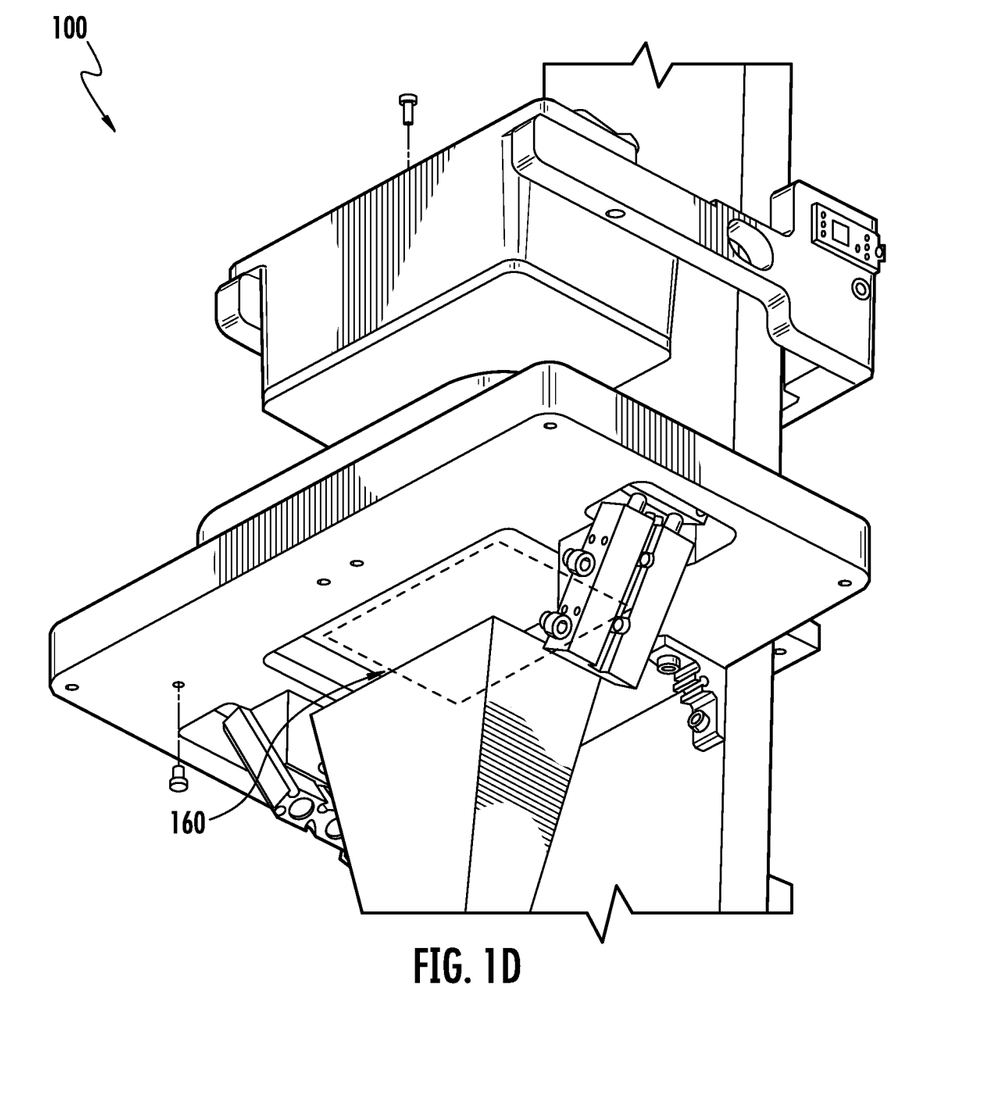

The chassis 105 is a frame to which some of the PRPS 100 components (e.g., the elevator system 145) are attached. In some embodiments, one or more portions of the chassis 105 is oriented vertically, which defines a vertical direction (i.e., a z-direction) along which some of the PRPS 100 components (e.g., the elevator system 145) move. The print platform 140 is connected to the elevator arms 150, which are movably connected to the elevator system 145. The elevator system 145 enables the print platform 140 to move in the z-direction (as shown in FIG. 1A) through the action of the z-stage 155. The print platform 140 can thereby be lowered into the resin pool 120 to support the printed part and lift it out of the resin pool 120 during printing.

The illumination system 110 projects a first image through the membrane 135 into the resin pool 120 that is confined within the resin tub 130. In some embodiments, the membrane 135 can be replaced by a rigid window material confining the resin pool 120 within the rein tub 130. The build area 160 is the area where the resin is exposed (e.g., to ultraviolet light from the illumination system) and cross-links to form a first solid polymer layer on the print platform 140. Some non-limiting examples of resin materials include acrylates, epoxies, methacrylates, urethane, silicone, vinyl, or other photoreactive resins that crosslink upon exposure to illumination. In some embodiments, the resin has a relatively short curing time compared to photosensitive resins with average curing times. In some embodiments, the resin is photosensitive to wavelengths of illumination from about 200 nm to about 500 nm, or to wavelengths outside of that range (e.g., greater than 500 nm, or from 500 nm to 1000 nm). In some embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 140 moves upwards (i.e., in the positive z-direction as shown in FIG. 1A), and a second layer can be formed by exposing a second pattern projected from the illumination system 110. This "bottom up" process can then be repeated until the entire object is printed, and the finished object is then lifted out of the resin pool 120.

In some embodiments, the illumination system 110 emits radiant energy (i.e., illumination) over a range of different wavelengths, for example, from 200 nm to 500 nm, or from 500 nm to 1000 nm, or over other wavelength ranges. The illumination system 110 can use any illumination source that is capable of projecting an image. Some non-limiting examples of illumination sources are arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

In some embodiments, the membrane 135 in PRPS 100 is uniquely designed to have high performance (e.g., tensile strength, oxygen permeability, and optical transparency and clarity) and durability (i.e., maintain its properties after many printed layers). For example, the high tensile strength of the present membranes allows a large tension to be placed on the membrane during printing, which causes the membrane to form a flat bottom of the resin pool. The oxygen permeability of the present membranes, in another example, enables the creation of a inhibition zone adjacent to the membrane within the resin pool, which inhibits the photopolymerization reactions in that zone and reduces the adhesion between a printed layer and the membrane. The optical properties of the present membranes, for example, the transparency and clarity enable short layer exposure times, and therefore fast printing rates, and high resolution printed features. The durability of the present membranes is also beneficial to reduce the operating costs of PRPSs.

Figure 1E:
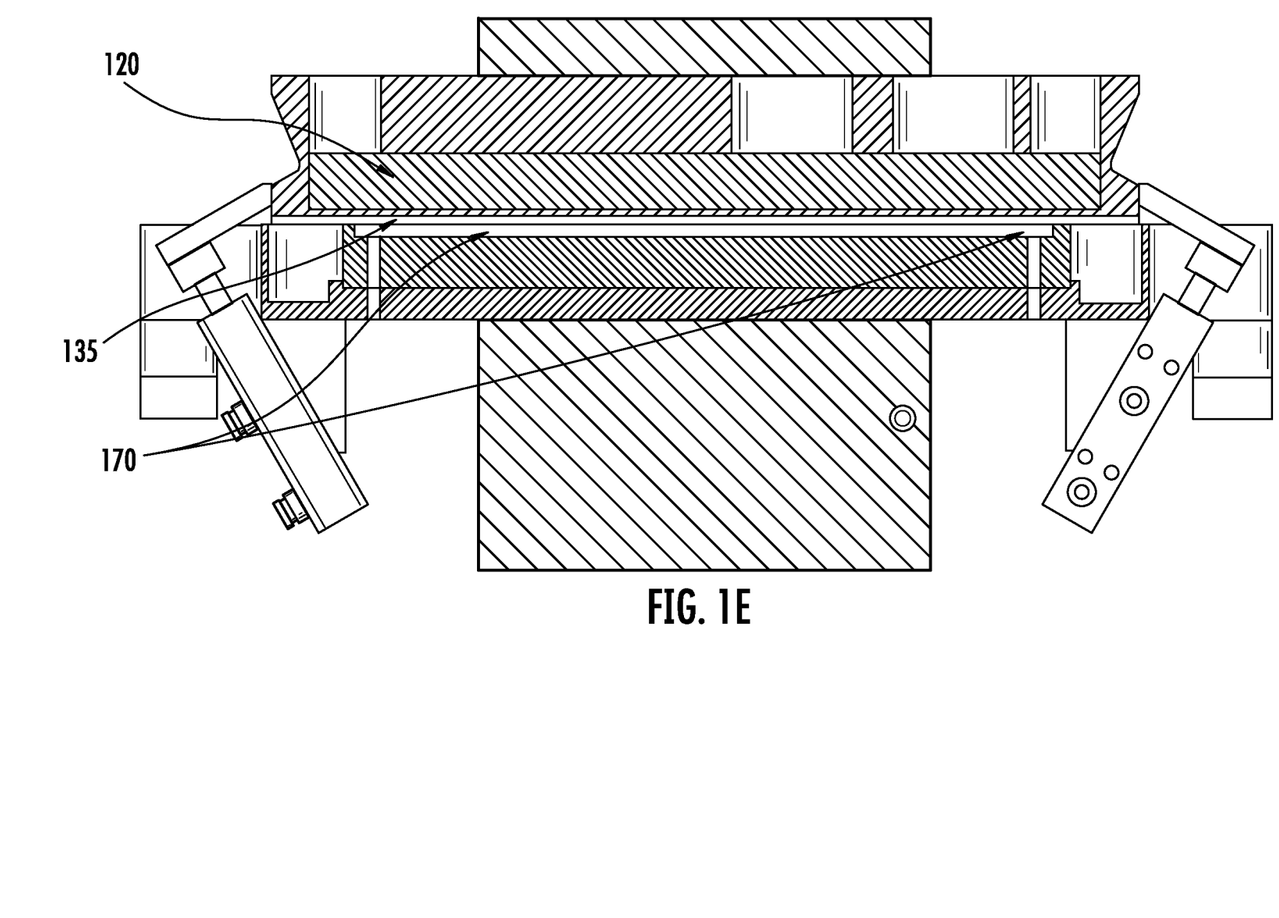

FIG. 1E is a cross-section of a portion of the PRPS 100 showing the resin pool 120, the membrane 135 beneath the resin pool, and additionally a groove 170 beneath the membrane 135. In some embodiments, groove 170 supports a transparent plate (not shown). The transparent plate can comprise any rigid material (e.g., glass or rigid plastic) that is capable of transmitting the wavelengths (e.g., UV) used to expose the resin. In some embodiments, the transparent plate makes contact with the membrane and supports the membrane from below. In other embodiments, the transparent plate is located a small distance below the membrane, and makes contact with and supports the membrane in the case of large membrane deflections. In some embodiments, it is advantageous to have the transparent plate spaced away from the membrane. Not to be limited by theory, in some embodiments where there is a space between the transparent plate and the membrane, more air (or oxygen) will permeate the membrane (compared to embodiments where the transparent plate is in direct contact with the membrane) and be absorbed by the resin adjacent to the membrane forming an inhibition zone.

In some embodiments, the transparent plate supports the membrane from below to prevent the membrane from being damaged during large deflections caused by particular events during the printing of an object. For example, between layer exposures the entire build platform is raised in preparation for the next layer to be printed. Due to stiction forces between the membrane and cured layer, when the build platform is moved, the membrane may be pulled-up and then released from the previously cured layer. When the membrane is released, so-called negative Z "drum-type" deflections can occur in the membrane. The transparent plate supporting the membrane can prevent such build platform motions from causing such deflections which can damage the membrane.

In addition to high performance and durability, in some embodiments, the present membranes are also producible at lower costs than conventional membranes. One method by which the production costs can be reduced is by substituting a less costly material for a costlier one, for example, by forming a polymer blend. Another method by which the production costs can be reduced is by using process flows that use fewer steps compared to conventional methods, such as by forming a membrane that has the desirable properties without requiring the formation of additional coatings or supporting layers.

Several approaches are described herein to form materials for membranes that overcome one or more deficiencies of conventional membrane materials. Some of the important requirements of the membrane materials are: 1) optical transparency (i.e. at the wavelength used to expose the resin), 2) mechanical strength, 3) solvent and chemical resistance (e.g., to prevent the membrane from reacting with the resin pool), 4) gas permeability (e.g., to oxygen), and 5) stability/durability (i.e., long-term chemical/solvent resistance, stable mechanical properties, and dimensional stability).

Some of the present approaches aim to produce membrane materials having a full set of the desired properties described above at lower costs compared to conventional membrane materials. One approach to reduce costs is to blend expensive polymers with less expensive polymers in morphologies that produce a high performing membrane (e.g., with properties similar to membranes consisting essentially of the expensive material). Another approach is to improve specific properties of certain polymers, preferably improving the properties of a relatively low-cost polymer to produce a high performing membrane (e.g., with properties similar to membranes consisting essentially of a conventional expensive high-performing material). Another approach is to form membranes from integrated multi-layer structures incorporating different materials to form a high-performance membrane with lower cost compared to conventional membranes.

In some embodiments, the present membranes have greater than 95%, or greater than 90%, or greater than 80% transmission to light in a wavelength range from 300 to 500 nm, or from 200 to 500 nm, or from 200 nm to 800 nm, or from 500 nm to 1000 nm, or over other wavelength ranges (e.g., when measured using ASTM D1003 methods). In some embodiments, the present membranes have tensile modulus greater than 1.0 GPa, or greater than 1.5 GPa, or greater than 2.0 GPa, or from 1.0 to 3.0 GPa (e.g., when measured using ASTM D638 methods). In some embodiments, the present membranes have tensile strength greater than 10 MPa, or greater than 15 MPa, or greater than 20 MPa, or greater than 30 MPa, or from 10 to 50 MPa (e.g., when measured using ASTM D2116 methods). In some embodiments, the present membranes have elongation to break at 23° C. greater than 5%, or greater than 6%, or greater than 7%, or from 5% to 8% (e.g., when measured using ASTM D638 methods). In some embodiments, the present membranes have Rockwell C scale hardness, when measured at 23° C., greater than 80, or greater than 85, or greater than 90, or from 80 to 100 (e.g., when measured using ASTM D785 methods). In some embodiments, the present membranes have Shore D durometer hardness at about 23° C. greater than 70, or greater than 75, or greater than 80, or from 70 to 90 (e.g., when measured using ASTM D1706 methods).

In addition to the properties listed above, in some embodiments, the present membranes can withstand prolonged exposure (e.g., greater than 10 hours, or greater than 1 day, or greater than 10 days) to the resin materials (e.g., acrylates and methyl acrylates) without breaking down or losing optical properties.

In addition to the properties listed above, in some embodiments, the present membranes have permeability to oxygen from 200 to 1050 Barrer, or greater than 200 Barrer, or greater than 500 Barrer, or greater than 950 Barrer, or greater than 1000 Barrer, or greater than 1050 Barrer (where 1 Barrer is $3.35 \times 10^{-16}$ mol·m·m$^{-2}$·s$^{-1}$·Pa$^{-1}$).

In some embodiments, the membrane comprises at least one polymer. Some non-limiting examples of polymers that can be used in the present membranes are TEFLON® AF2400 (i.e., a copolymer with 87% 2,2-bistrifluoromethyl-4,5-difluoro-1,3-dioxole monomers and 13% tetrafluoroethylene monomers), HYFLON® 60 AD (i.e., a copolymer with 40% tetrafluoroethylene monomers and 60% 2,2,4-trifluoro-5-trifluoromethoxy-1,3-dioxole monomers), crystalline fluoropolymers, elastomeric fluoropolymers, fluorinated ethylene propylene (FEP), Viton, FKM fluoroelastomers (e.g., DAI-EL® T530 fluoroelastomer), polytetrafluoroethylene (PTFE), perfluoroalkoxy alkane (PFA), polychlorotrifluoroethylene (PCTFE), cyclic olefin block copolymers (CBC) (e.g., VIVION™), cyclic olefin polymer (COP) (e.g., TOPAZ™ or INFUSE™), ethylene tetrafluoroethylene (ETFE), polymethylpentene (PMP), polyacrylates, polyurethanes, polysulfides, and combinations thereof.

In some embodiments, the membrane comprises a polymeric blend comprising two or more polymers (or components, or component polymers). In some embodiments, the polymeric blend contains a first polymer and a second polymer, and the mass ratio of the first to the second polymers is from 0% to 100%, or from greater than 0% to less than 100%, or from 1% to 99%, or from 10% to 90%, or approximately 1%, or approximately 10%, or approximately 20%, or approximately 30%, or approximately 40%, or approximately 50%. In some embodiments, the polymeric blend contains a first polymer and a second polymer, and the mass ratio of the first to the second polymers has a range with a lower bound of 1%, 5%, 10%, 20%, 30%, 40%, or 45%, and an upper bound of 55%, 60%, 70%, 80%, 90%, 95%, or 99%. For example, the first and second polymers can be selected from the list of polymers above.

In some embodiments, the membrane comprises a layered structure (i.e., a multi-layer structure), with a first polymer layer and a second polymer layer, and optionally more than two polymers layers. In some embodiments, a bonding layer (e.g., a metal such as titanium or chromium or silicone) is used between the first and second polymer layers in the layered structure. In some embodiments, a first stand-alone polymer sheet is provided, the bonding layer is deposited on one side of the first freestanding polymer sheet, and then a second freestanding polymer sheet is laminated to the first polymer sheet with the bonding layer between them. The first polymer layer and/or the second polymer layer, and/or the more than two polymer layers can be, for example, any of the polymers listed above. In some embodiments, the first polymer layer and/or the second polymer layer, and/or the more than two polymer layers can be, for example, blends each comprising first and second polymer components, where the first and second polymer components can be selected from the list of polymers above. In the above embodiments, the composition of the first polymer layer and the second polymer layer, and the more than two polymers layers can be the same throughout the layered structure, or can vary between the layers of the layered structure.

In some embodiments, the membrane comprises a polymeric blend containing a first polymer that is TEFLON® AF2400, and at least one additional polymer. In some embodiments, the membrane with TEFLON® AF2400 and at least one other polymer will retain some or all of the properties of TEFLON® AF2400. Some non-limiting examples of polymers that can be blended with TEFLON® AF2400 are HYFLON® 60 AD, crystalline fluoropolymers, polymethylpentene (PMP), elastomeric fluoropolymers, FEP, Viton, CBC (e.g., VIVION™), COP (e.g., TOPAZ™ or INFUSE™), FKM fluoroelastomers (e.g., DAI-EL® T530 fluoroelastomer), PTFE, PFA, PCTFE, CPT, ETFE, EFEP, and combinations thereof.

In other embodiments, the membrane comprises a polymeric blend containing a first polymer that is a fluoropolymer, and at least one additional polymer such as a polyacrylate, a polyurethane, or a polysulfide.

The polymer blends of the membrane can be immiscible polymer blends (heterogeneous polymer blends), compatible polymer blends, or miscible polymer blends (homogeneous polymer blend). Blends comprising immiscible polymer blends will generally have two glass transition temperatures. Compatible polymer blends are a subset of immiscible polymer blends that have macroscopically uniform physical properties, which are generally caused by sufficiently strong interactions between the component polymers. Miscible polymer blends are polymer blends with a single-phase containing all of the component polymers, and generally will have one glass transition temperature.

Figure 2:
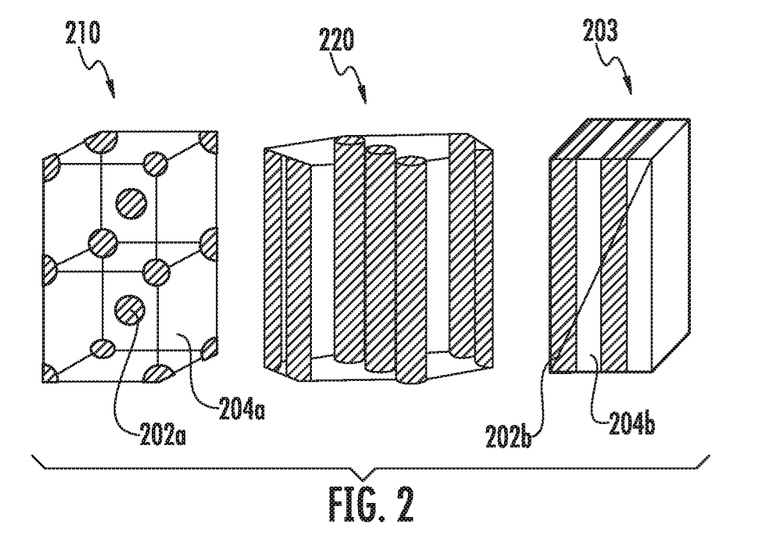
FIG. 2 shows examples of ordered polymer blend morphologies, in accordance with some embodiments.
Figure 3A:
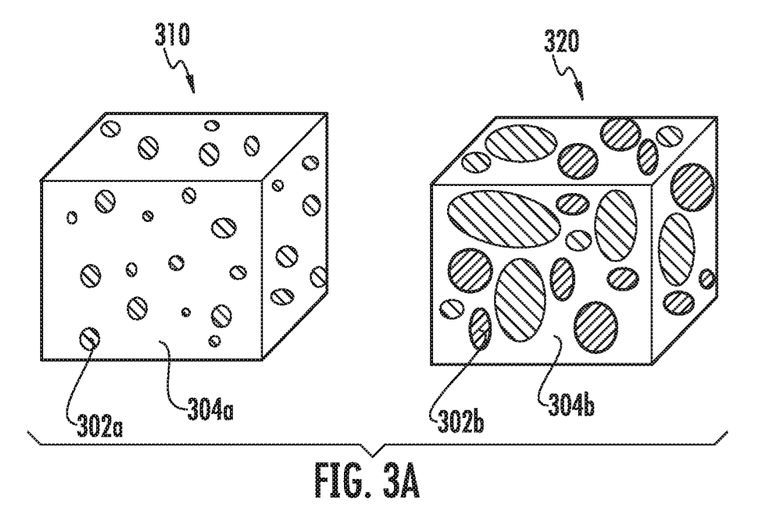
FIGS. 3A, 3B and 4 show examples of disordered polymer blend morphologies, in accordance with some embodiments.
Figure 3B:
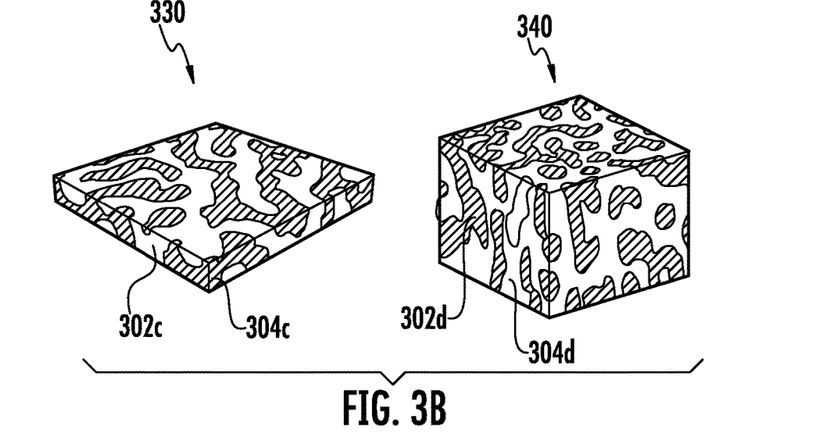
Figure 4:
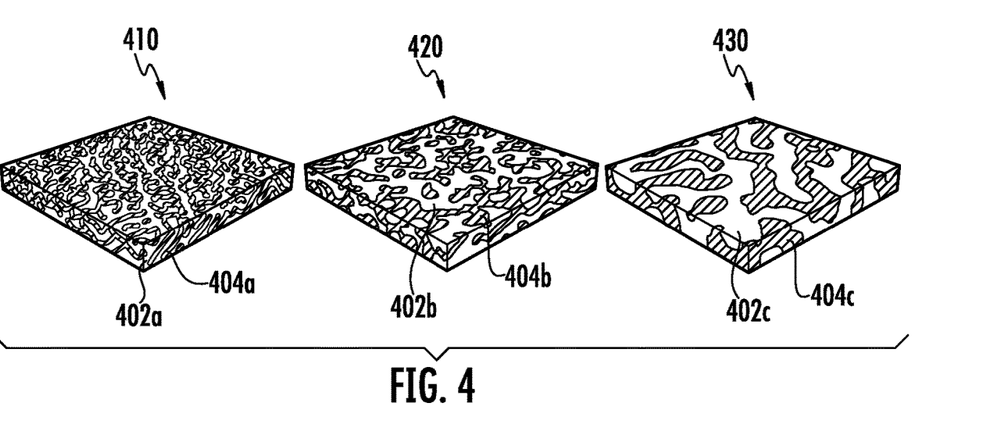

The morphology and composition of the polymer blend can be tuned to produce membranes with different properties, such as strength, clarity and durability. FIGS. 2-4 show some non-limiting examples of different classes of morphologies, including regular and irregular morphologies, discontinuous and continuous morphologies, morphologies with small length scale and large length scale phases, and various composition ratio between the polymer component phases.

The polymer blend morphology will in general depend on the species of polymer components being blended, the composition ratio between the components, and the polymer blend processing conditions. For example, in some embodiments, the blended polymer is an immiscible or compatible polymer blend that exhibits polymer spinodal decomposition and desirable morphology, which leads to properties for membrane materials. Through spinodal decomposition, the blended polymer can contain a finely or more coarsely dispersed microstructure (e.g., from the nanometer length scale to the tens of microns length scale) that can enhance the physical properties of the blended material (e.g., higher strength, toughness, flexibility, and/or oxygen permeability) and/or improve the transmission of the material to electromagnetic radiation (e.g., in a wavelength range from 200 to 500 nm, or from 200 nm to 800 nm, or from 500 nm to 1000 nm, or other wavelength ranges) compared to those of one or more of the individual component polymers. In some embodiments, immiscible (or compatible) polymer blends form an ordered structure containing the components (i.e., a regular, repeating structure of two or more component polymers).

FIG. 2 shows some non-limiting examples of ordered structures within a polymer blend comprising a first polymer component 202a-b, and a second polymer component 204a-b. Structure 210 shows an example of a spherical first polymer phase 202a within a second polymer phase matrix 204a. Structure 220 shows an example of a columnar phase of a first polymer component within a second polymer component matrix. Structure 230 shows an example of a lamellar structure between a first polymer component phase 202b and a second polymer component phase 204b. In some embodiments, the length scale of the polymer component phases (i.e., the average length along a line through the polymer blend over which the first and second phase will repeat), or the spacing of the lamella (i.e., the repeat length) can be from 1 nm to 100 microns, or from 1 nm to 10 nm, or from 1 nm to 100 nm, or from 100 nm to 100 microns. In lamellar structures, the number of lamella can be from 2 to more than 1000, or from 2 to 1000, or from 2 to 10,000, or from 2 to 10.

In some embodiments, immiscible (or compatible) polymer blends form a disordered structure containing the components (i.e., an irregular, non-repeating structure of two or more component polymers). The shapes of the phases in the examples shown in FIG. 2 can also exist in disordered structures. Disordered structures can contain approximately spherical phases similar to those shown in structure 210, or approximately rod-like phases similar to those shown in structure 220, or approximately plate-like phases similar to those shown in structure 230.

FIGS. 3A-3B and FIG. 4 show some non-limiting examples of disordered structures within a polymer blend comprising a first polymer component 302a-d, and a second polymer component 304a-d.

Structures 310 and 320 in FIG. 3A show examples of an irregular structure with one discontinuous phase (i.e., forming islands) of a first component polymer 302a-b within a continuous matrix of a second polymer component 304a-b. Structure 310 is an example of a lower concentration of a first polymer component 302a blended with a higher concentration of a second polymer component 304a, whereas structure 320 is an example of a blend with approximately equal concentrations of the first and second polymer component phases 302b and 304b. The discontinuous phase 302a-b can be any shape, such as spherical, spheroidal, rod-like, plate-like, or irregularly shaped.

Structures 330 and 340 in FIG. 3B show examples of an irregular structure where both polymer component phases 302c-d and 304c-d have continuous regions (or, partially continuous regions, meaning that they are continuous over some volume of the polymer blend) and discontinuous regions (i.e., islands). Structure 340 is an example of a less continuous first polymer component 302d blended with a more continuous second polymer component 304d, whereas structure 330 is an example of a blend with approximately equal degrees of continuity of the first and second polymer component phases 302c and 304c.

FIG. 4 shows some non-limiting examples of irregular structures where both polymer component phases 402a-c and 404a-c have continuous regions and discontinuous regions, with different polymer component phase length scales for roughly the same ratio of first to second polymer component phases. Structure 410 shows an example of the smallest polymer component phase length scale, structure 430 an example of the largest polymer component phase length scale, and structure 420 shows an example of an intermediate polymer component phase length scale. In some embodiments, the polymer component phase length scales can be from 0.5 nm to 10 microns, or from 0.5 nm to 10 nm, or from 0.5 nm to 100 nm, or from 10 nm to 1 micron.

In some embodiments, a bonding layer is provided between the first polymer component phase and the second polymer component phase in a polymer blend. Some examples of bonding layers are metals such as chromium and titanium, and polymers such as silicone. In some embodiments, the bonding layer enables or improves the mixing between dissimilar polymer components. The bonding layer can also affect how the first and second polymers segregate (or intermix, or separate) during processing, which impacts the morphology of the resulting polymer blend. In some embodiments, the material (e.g., titanium or silicone) that will form the bonding layer between the polymer components is combined as a third component along with the first and second polymer component during mixing, and segregates to the interface (forming an interfacial layer) between the first and second polymer components during processing. In some embodiments, the material that will form the bonding layer between the polymer components is attached to one or more of the components before blending (e.g., through covalent bonds).

Another method to control the morphology and length scale of the phases of a blended polymer for membranes is to add nucleating agents. In some embodiments, the membrane contains a polymer, or a polymer blend, and also contains one or more nucleating agents. Nucleating agents can be introduced during processing (e.g., blending, formulation, or casting) of the polymers to form the membrane, and can impact morphology of the resulting polymer blend, as well as the free volume, degree of crystallinity, crystallite size, and/or crystallite orientation of a polymer blend or single component polymer for a membrane. Some non-limiting examples of nucleating agents for polymer blends or single component polymers are oxide particles, salts, aromatic carboxylic acid salts, sodium benzoate, talc particles, modified sorbitol, sugar derivatives, highly dispersed silica particles, crystalline pigments, and aromatic heterocyclic phosphate.

In some embodiments, the membrane contains a polymer, or a polymer blend that also contains an additive that affects one or more properties of the membrane material. In some embodiments, the additive affects the free volume of the membrane material. One example of a class of additives that can be combined with fluoropolymers (or fluoropolymer blends) to affect the free volume of the membrane material are POSS® chemicals (i.e., POSS, polyhedral oligomeric silsesquioxane, made by Hybrid Plastics). POSS can interact with the crystallization of fluoropolymers by insertion into the crystalline region, which disrupts the inter-polymer chain interaction in the crystallites. In turn, POSS increases the mobility of the polymer chains, decreases the crystallinity, and increases the free volume content of the material. The increase of free volume within the polymeric membrane can lead to increased oxygen permeability, which is advantageous to the membrane performance (e.g., by reducing adhesion and/or promoting the creation of an inhibition zone). Other examples of additives that can affect the free volume of a polymer or a polymer blend are low molecular weight polymers and/or plasticizers (e.g., DAI-EL® G-101 (i.e., a copolymer of vinylidene fluoride and hexafluoro propylene with a number of average molecular weight of approximately 3000) and/or DAI-EL® T530).

In some embodiments, the membrane contains a polymer, or a polymer blend, or a multi-layered structure that enables an inhibition zone within the resin pool adjacent to the membrane. Conventional membrane materials (e.g., TEFLON® AF2400) have high oxygen permeability. The oxygen molecules that permeate through the membrane create the inhibition zone near (or at, or adjacent to) the interface of the membrane and the photoreactive resin pool. In some cases, the oxygen inhibits the reaction rate of the photoreactive resin in this zone, which keeps the part being printed from sticking to the membrane. The reduced adhesion can also impact the overall print-speed by allowing the print platform supporting the printed layer to move away from the membrane more quickly between layers. Not to be limited by theory, photoreactive resin can react via free-radical polymerization when exposed to a certain wavelength of illumination, and the oxygen diffusing through the membrane can react with the free radicals during the photoreactive print process, which has the effect of reducing the photopolymerization rate in the oxygen-rich inhibition zone.

In some embodiments, the inhibition zone has a thickness greater than 0 microns and less than 100 microns, or from 0.1 nm to 100 microns, or from 1 nm to 100 microns, or from 0.1 nm to 10 microns, or from 1 nm to 10 microns. In general, the inhibition zone thickness is less than the incident light penetration depth so that the incident light can reach (and react with) the resin above the inhibition zone. In some cases, the inhibition zone can scatter the incident light and reduce the resolution of a pattern of the incident light in the build plane, and is less of an issue with thinner inhibition zones. In some cases, the focal plane of the incident light is located at the interface between the inhibition zone and the resin above the inhibition zone. In some cases, the inhibition zone has a sufficient thickness (e.g., greater than 10 microns, or greater than 50 microns) to reduce the forces on the membrane when an exposed layer is moved away from the membrane. Membrane permeability to oxygen is one factor that can affect the thickness of the inhibition zone, and is therefore an important parameter of the material(s) making up the membrane. Typically, the exposure time of a layer is small (e.g., from 10 to 100 ms) compared to the "layer move" time (e.g., from 1 to 10 seconds), which is the time that it takes to move an exposed layer away from the membrane between exposures. As a result, an effective inhibition zone enables faster movement of a part away from a membrane, which can have a significant impact on the total duration of a print run. Additionally, in some embodiments, "pump moves", which are larger moves that bring the partially printed part farther away from the membrane than the smaller moves where a next layer is brought into the exposure plane, are performed periodically. In some embodiments, an effective inhibition zone enables less frequent pump moves (e.g., by allowing fresh unreacted resin to more easily be transported to the build area), or enables faster movement during pump moves. In general, the amount of stress experienced by the part and/or the membrane during printing, layer moves, and pump moves is at least partially dependent on the geometry of the part being printed.

Some example reactions of oxygen with a photoinitiator (PI) and/or a free radical (R.) are shown below, illustrating the inhibiting effects of oxygen, in accordance with some embodiments.

In the quenching reaction below, oxygen reacts with the excited state of the photoinitiator ("PI*") and the photoinitiator returns to an unexcited, non-reactive state ("PI"). The result is that fewer effective free radicals are produced by the photoinitiator, and fewer polymer chains are formed.

Quenching reaction equation example: PI*+$O_2$→PI+ $O_2$*

In the scavenging reaction below, oxygen reacts with a more strongly propagating radical (R.) to produce a more weakly propagating radical (R—O—O.), thereby reducing polymer chain growth rate.

Scavenging reaction equation example: R.+$O_2$*→R—O—O.

In some embodiments, the properties (e.g., free volume) of the present membranes are tailored to optimize the permeability of oxygen in order to create an optimal inhibition zone. Some examples of materials and methods to tailor the free volume and affect the oxygen permeability of membrane materials are membranes containing multi-layered structures, polymer blends, nucleating agents, and/or additives. Furthermore, processing conditions of membrane materials can be adjusted to tailor the free volume and affect their oxygen permeability, as is described further below.

In addition to oxygen, there are other materials that can reduce photopolymerization rates within the inhibition zone in the resin pool by inhibiting free radical polymerization reactions (e.g., by quenching and/or scavenging free radicals). In some embodiments, a membrane for a photoreactive additive manufacturing system contains an inhibitor material that inhibits the photoinitiator and/or converts more strongly propagating radicals to more weakly propagating radicals, mimicking the oxygen inhibition effect of a permeable membrane material. This inhibitor material can be applied to a membrane as a coating (on the side of the membrane adjacent to the resin pool) or can be incorporated into the bulk (thereby also into the surfaces) of the membrane material. In some embodiments, the inhibitor material only effectively inhibits the free radical polymerization near (or at, or adjacent to) the interface between the membrane and the resin pool and the inhibition zone does not extend too far (e.g., less than half of the light absorption length, or from 10 to 100 microns) into the resin pool. In some embodiments, the inhibitor material is not (or is minimally) absorbed or dissolved into the photoreactive resin. In some embodiments, the composition of the inhibitor material is chosen to control the degree of inhibition and the properties (e.g., reaction rates) of the photoreactive resin near (or at, or adjacent to) the interface between the membrane and the resin pool. In some embodiments, the inhibitor material is coated as a layer on the membrane (adjacent to the resin), and the inhibition capacity is modulated by the composition and/or the thickness of the layer.

In some embodiments, the inhibitor material contains electron-rich moieties that are used as free radical scavengers. Inhibitor materials with electron-rich moieties can efficiently capture free radicals and can therefore fulfill the same role as the oxygen at the membrane-resin interface. Some non-limiting examples of inhibitor materials are (methyl) acrylate polymers, (methyl) acrylic urethane polymers (or other urethanes), and polysulfides (e.g., Thiokol, polysulfide rubber (PTR)). In some embodiments, the inhibitor material is a cross-linked polymer to prevent dissolution of the inhibitor material by the photoreactive resin. The families of polymers described above, when properly prepared (e.g., cross-linked), are examples of inhibitor materials that contain electron rich moieties (e.g., O=C—O, O=C—O, C—N—C, and S—S—) and that will not dissolve into the photoreactive resin pool.

In some embodiments, the inhibitor material contains a polyvalent metal that scavenges free radicals. Some non-limiting examples of polyvalent metal ions that can be used as inhibitor materials are polyvalent metal ions of copper, zinc, aluminum, titanium, or combinations thereof. These metals can be introduced into the present membrane formulations as organic or inorganic salts. In some embodiments, the metal ions do not leach, or have low rates of leaching, into the resin.

In some embodiments, the inhibitor material is applied as a coating to a window material (e.g., a membrane, sheet or plate), where the window material does not have a high oxygen permeability. The term "window material" as used herein can be a membrane (as described herein), or a rigid material. For example, the window material can be a flexible membrane (e.g., composed of flexible polymers), or a rigid plate or sheet (e.g., of glass or plastic), that has high transparency to photoreactive light wavelengths. Such inhibitor material coated windows can be advantageous because they are lower cost and/or have improved mechanical properties and/or durability compared to conventional membranes.

In some embodiments, the membrane is composed of a polymer or a polymer blend and the inhibitor material is mixed with the polymer(s) in the bulk of the membrane. The inhibitor material can be mixed with the polymer(s) in the bulk of the membrane in any fractions (e.g., from less than 1% to greater than 99%, and any range in between). In some embodiments, the membrane is composed entirely of one or more inhibitor materials. For example, the membrane material can contain (in whole or in part) crosslinked (methyl) acrylate polymers, acrylic urethane polymers, other urethanes, or cross-linked polysulfides to meet the mechanical durability and strength requirements (e.g., support repetitive tensioning and address stress fatigue) while also including built-in polymerization inhibiting properties.

Methods of producing membranes for photoreactive additive manufacturing systems will now be described. Each of the following methods are capable of producing polymer blends with various morphologies. The membrane materials described herein can be produced using one or more of the below methods.

In a first embodiment, a method for forming a polymeric blend includes solution mixing a first polymer and a second polymer. The first and second polymer can be dissolved in the same or different solvents to form a first and second solvent solution, and the solutions can be mixed together to form a solvent solution mixture. The solvent solution mixture can then be cast into a film using polymeric film casting equipment. The properties (e.g., morphology, free volume, etc.) of the resulting membranes depend on various factors, including the characteristics of the solvent(s) used, the concentrations of the polymers in the solutions, and the parameters of the film casting process (e.g., the casting speed, the number of stages in the process, the temperature of each stage, gel thickness control, order of addition of the first and second solvent solutions, and/or the solvent removal rate). These solution-based mixing methods enable the formation of many different types of morphologies.

In a second embodiment, a method for forming a polymeric blend includes melt mixing a first polymer and a second polymer. The melt mixture can then be extruded using conventional extrusion equipment. In some cases, the mixing of two polymers occurs within combined mixing and extruding equipment (i.e., wet mixing). In some cases, internal batch mixers can be used to melt mix a first polymer and a second polymer. In the case of melt mixed polymers, the morphology of the resulting material depends on the volume fractions of the first and second polymers in the mix and the polymer properties including the interfacial energy (or interfacial tension between the first and second polymers), the polymer viscosities (at the mixing temperature), and the mixing conditions. Additionally, extrusion processes can be used to form certain morphologies, such as lamellar morphologies and morphologies containing rod-like phases.

In a third embodiment, a first polymer can be mixed with a first monomer and the monomer can be polymerized into a second polymer to form a mixture of the first and second polymers. Alternatively, a first and a second monomer can be mixed together and polymerized in a single step. These polymerization mixing methods enable the formation of many different types of morphologies.

In a fourth embodiment, a first polymer and a second polymer are blended using latex blending. Latex blending can be advantageous in systems where the first and second polymers are immiscible (i.e., have larger interfacial tensions). In some embodiments, latex blending is used to form a membrane comprising a polymeric blend, wherein the polymeric blend contains two immiscible polymers. These latex mixing methods enable the formation of many different types of morphologies composed of polymers that may be immiscible.

In a fifth embodiment, a first polymer and a second polymer are blended by mixing them together in powder or granular form (i.e., dry mixing) before being added to an extruder for film formation. In these processes the resulting morphology can be affected by the particle size distributions of the first and second polymers, as well as the film casting process parameters. These dry mixing methods enable the formation of many different types of morphologies.

In some embodiments, a polymer or a polymer blend is processed to produce a membrane with a controlled free volume content. In some embodiments, processing conditions are chosen to tailor the free volume, degree of crystallinity, crystallite size, and/or crystallite orientation of the polymers (or blended polymers) within the formed membrane. In some embodiments, polymeric membranes are formed using melt processing, and one or more melt processing conditions are chosen to form a membrane with desirable properties (e.g., free volume content, mechanical properties, and/or durability). For example, a fast quench rate and/or high initial melt temperature can increase the amorphous content of a semi-crystalline polymer (or polymer blend) and form a membrane with increased free volume. In some embodiments, membranes are produced using polymer casting methods, and the casting processing parameters are chosen to form a membrane with desirable properties (e.g., free volume content, mechanical properties, or durability). For example, casting polymers or polymer blends from different solvents or solvent blends under a variety of conditions can result in polymer materials of different morphologies, and thus different properties (e.g., free volume content).

EXAMPLES

Example 1: FEP/TEFLON® AF2400 Multi-Layer Membrane

In this example, an FEP/TEFLON® AF2400 multi-layer membrane is produced using solution processes. In this method, an FEP film is provided, and a coating of TEFLON® AF2400 is applied to the FEP film. The FEP film can be processed using any conventional film processing technique (such as extrusion or casting). Before depositing the TEFLON® AF2400, the FEP film is pretreated in a 5% NaOCl for 24 hours. A solution of 1% TEFLON® AF2400 in FC40 solvent (an immiscible fluorocarbon oil) is then prepared and applied to the FEP film. The wet coated film is then dried in a vacuum oven at 50° C. to produce the multi-layer membrane material.

The resulting membrane is advantageous because it will retain much of the high performance of a pure TEFLON® AF2400 membrane, but will be lower cost due to the utilization of the less costly FEP material.

Example 2: FEP/TEFLON® AF2400 Polymeric Blend Membrane

In this example, an FEP/TEFLON® AF2400 polymeric blend membrane is produced using a solution mixing method. In this method, an FEP emulsion is mixed with a TEFLON® AF2400 solution and mixed in a heated reaction vessel. Specifically, in this example, 250 g of FEP emulsion is mixed with 100 g of a solution containing 1% AF2400 in FC40 solvent. The emulsion and solution above are combined in a glass reaction vessel with a shearing blade and vacuum capability. While under vacuum, the mixture is heated and vigorously sheared until the mixture becomes a thick paste. The paste can then be cast and dried in a vacuum oven at 50° C. to produce the polymeric blend membrane material.

The resulting membrane is advantageous because it will retain much of the high performance of a pure TEFLON® AF2400 membrane, but will be lower cost due to the utilization of the less costly FEP material.

Example 3: FEP with Free-Volume Modified Using POSS

In this example, an FEP polymeric membrane with tailored free-volume is produced using a melt mixing method. In this method, 50 g of FEP pellets are melted in a heated mixer (e.g., a Brabender Mixer) at 250° C. until homogenized. Once the FEP is homogenized, 2 g of POSS powder is slowly added. The FEP/POSS mixture can then be formed into a film using any conventional film processing technique (such as extrusion or casting). The resulting film will have higher free-volume than FEP alone, since the fine particles of POSS can lodge between polymer chains thereby increasing the free-volume of the material.

The resulting membrane is advantageous because the increased free-volume of the membrane material will improve the air and oxygen permeability of the membrane, compared to membranes composed of pure FEP.

Example 4: FEP/DAI-EL® T530 Fluoroelastomer Polymeric Blend Membrane

In this example, an FEP/DAI-EL® T530 fluoroelastomer polymeric blend membrane is produced using a melt mixing method. In this method, 50 g of FEP pellets are melted in a heated mixer (e.g., a Brabender Mixer) at 250° C. until homogenized. Once the FEP is homogenized, 10 g of DAI-EL® T530 fluoroelastomer is slowly added. The FEP/DAI-EL® T530 fluoroelastomer mixture can then be formed into a film using any conventional film processing technique (such as extrusion or pressing). The DAI-EL® T530 fluoroelastomer can increase the free-volume of the polymer blend compared to pure FEP material.

The resulting membrane is advantageous because the increased free-volume of the membrane material will improve the air and oxygen permeability of the membrane, compared to membranes composed of pure FEP.

Example 5: FEP/DAI-EL® G-101 Polymeric Blend Membrane

In this example, an FEP/DAI-EL® G-101 polymeric blend membrane is produced using a melt mixing method. In this method, 50 g of FEP pellets are melted in a heated mixer (e.g., a Brabender Mixer) at 250° C. until homogenized. Once the FEP is homogenized, 2 g of DAI-EL® G-101 is slowly added. The FEP/DAI-EL® G-101 mixture can then be formed into a film using any conventional film processing technique (such as extrusion or pressing). DAI-EL® G-101 is an ultra-low molecular weight fluoroelastomer, which can be used as a plasticizer in fluoroelastomers. Plasticizers, in general, increase the free volume of host polymer by having more chain ends or pushing the polymer chain apart, and therefore the DAI-EL® G-101 can increase the free-volume of the polymer blend compared to pure FEP material.

The resulting membrane is advantageous because the increased free-volume of the membrane material will improve the air and oxygen permeability of the membrane, compared to membranes composed of pure FEP.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A photoreactive additive manufacturing system comprising:
a resin tub;
a membrane comprising a polymeric blend comprising a first polymer phase and a second polymer phase; and
a resin pool confined by the resin tub and the membrane;
wherein:
the first polymer phase is a continuous matrix;

the second polymer phase is a discontinuous phase located within the continuous matrix of the first polymer phase;

the first polymer phase comprises a fluoropolymer; and the second polymer phase comprises a polyacrylate, a polyurethane, or a polysulfide.

2. The photoreactive additive manufacturing system of claim 1, wherein:

the polymeric blend further comprises a nucleating agent selected from the group consisting of oxide particles, salts, aromatic carboxylic acid salts, sodium benzoate, talc particles, modified sorbitol, sugar derivatives, highly dispersed silica particles, crystalline pigments, and aromatic heterocyclic phosphate.

3. The photoreactive additive manufacturing system of claim 1, wherein the polymeric blend further comprises polyhedral oligomeric silsesquioxane.

4. A photoreactive additive manufacturing system comprising:

a resin tub;

a membrane; and a resin pool confined by the resin tub and the membrane;

wherein the membrane comprises:

a fluoropolymer; and polyhedral oligomeric silsesquioxane, or a copolymer of vinylidene fluoride and hexafluoro propylene with a number of average molecular weight of approximately 3000, as an additive to control a free volume of the fluoropolymer.

5. The photoreactive additive manufacturing system of claim 4, wherein:

the fluoropolymer further comprises a nucleating agent selected from the group consisting of oxide particles, salts, aromatic carboxylic acid salts, sodium benzoate, talc particles, modified sorbitol, sugar derivatives, highly dispersed silica particles, crystalline pigments, and aromatic heterocyclic phosphate.

6. The photoreactive additive manufacturing system of claim 1, wherein the fluoropolymer comprises a copolymer with 87% 2,2-bistrifluoromethyl-4,5-difluoro-1,3-dioxole monomers and 13% tetrafluoroethylene monomers.

7. The photoreactive additive manufacturing system of claim 1, wherein the polymeric blend further comprises a copolymer of vinylidene fluoride and hexafluoro propylene with a number of average molecular weight of approximately 3000.

8. The photoreactive additive manufacturing system of claim 1, wherein the polymeric blend further comprises acrylate polymers.

9. The photoreactive additive manufacturing system of claim 1, wherein the polymeric blend further comprises acrylic urethane polymers.

10. The photoreactive additive manufacturing system of claim 1, wherein the polymeric blend further comprises cross-linked polysulfide polymers.

11. The photoreactive additive manufacturing system of claim 1, wherein the polymeric blend further comprises a bonding layer between the first polymer phase and the second polymer phase, wherein the bonding layer comprises titanium.

12. The photoreactive additive manufacturing system of claim 1, wherein the polymeric blend further comprises a bonding layer between the first polymer phase and the second polymer phase, wherein the bonding layer comprises chromium.

13. The photoreactive additive manufacturing system of claim 1, wherein the polymeric blend further comprises a bonding layer between the first polymer phase and the second polymer phase, wherein the bonding layer comprises silicone.

14. The photoreactive additive manufacturing system of claim 1, wherein the membrane further comprises greater than 80% transmission to light in a wavelength range from 300 nm to 500 nm when measured using ASTM D1003 methods.

15. The photoreactive additive manufacturing system of claim 1, wherein the membrane further comprises a tensile modulus from 1.0 GPa to 3.0 GPa when measured using ASTM D638 methods.

16. The photoreactive additive manufacturing system of claim 1, wherein the membrane further comprises a tensile strength from 10 MPa to 50 MPa when measured using ASTM D638 methods.

17. The photoreactive additive manufacturing system of claim 1, wherein the membrane further comprises an elongation to break at 23° C. from 5% to 8% when measured using ASTM D638 methods.

18. The photoreactive additive manufacturing system of claim 1, wherein the membrane further comprises Rockwell C scale hardness at 23° C. from 80 to 100 when measured using ASTM D785.

19. The photoreactive additive manufacturing system of claim 1, wherein the membrane further comprises Shore D durometer hardness at 23° C. from 70 to 90 when measured using ASTM D1706 methods.

20. The photoreactive additive manufacturing system of claim 1, wherein the membrane further comprises permeability to oxygen from 200 Barrer to 1050 Barrer.

21. The photoreactive additive manufacturing system of claim 4, wherein the fluoropolymer comprises a copolymer with 87% 2,2-bistrifluoromethyl-4,5-difluoro-1,3-dioxole monomers and 13% tetrafluoroethylene monomers.

22. The photoreactive additive manufacturing system of claim 4, wherein the membrane further comprises acrylate polymers.

23. The photoreactive additive manufacturing system of claim 4, wherein the membrane further comprises acrylic urethane polymers.

24. The photoreactive additive manufacturing system of claim 4, wherein the membrane further comprises cross-linked polysulfide polymers.

25. The photoreactive additive manufacturing system of claim 4, wherein the membrane further comprises permeability to oxygen from 200 Barrer to 1050 Barrer.

* * * * *